(12) United States Patent
Kumano

(10) Patent No.: US 10,717,481 B2
(45) Date of Patent: Jul. 21, 2020

(54) ELASTIC CRAWLER AND ELASTIC CRAWLER DEVICE

(71) Applicant: BRIDGESTONE CORPORATION, Chuo-ku, Tokyo (JP)

(72) Inventor: Youichi Kumano, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 15/574,841

(22) PCT Filed: Apr. 20, 2016

(86) PCT No.: PCT/JP2016/002111
§ 371 (c)(1),
(2) Date: Nov. 17, 2017

(87) PCT Pub. No.: WO2016/185670
PCT Pub. Date: Nov. 24, 2016

(65) Prior Publication Data
US 2018/0148112 A1 May 31, 2018

(30) Foreign Application Priority Data

May 21, 2015 (JP) .................................. 2015-103872

(51) Int. Cl.
*B62D 55/24* (2006.01)
*B62D 55/14* (2006.01)
(Continued)

(52) U.S. Cl.
CPC ........... *B62D 55/244* (2013.01); *B62D 55/06* (2013.01); *B62D 55/125* (2013.01); *B62D 55/14* (2013.01)

(58) Field of Classification Search
CPC .... B62D 55/244; B62D 55/06; B62D 55/125; B62D 55/14; B62D 55/253
(Continued)

(56) References Cited

U.S. PATENT DOCUMENTS

| 5,380,076 A * | 1/1995 | Hori ..................... B62D 55/202 305/171 |
| 6,170,925 B1 * | 1/2001 | Ono ....................... B62D 55/24 305/171 |

(Continued)

FOREIGN PATENT DOCUMENTS

| JP | H04262978 A | 9/1992 |
| JP | 2000177658 A | 6/2000 |

(Continued)

OTHER PUBLICATIONS

Jul. 19, 2016, International Search Report issued in the International Patent Application No. PCT/JP2016/002111.

*Primary Examiner* — Jacob D Knutson
(74) *Attorney, Agent, or Firm* — Kenja IP Law PC

(57) ABSTRACT

The elastic crawler (1) according to this disclosure comprises: an endless belt-like main body (2) having elasticity; a plurality of cores (3) embedded in a circumferential direction of the main body (2); a plurality of lugs (5) each being arranged in a manner protruding from an outer circumferential surface of the main body (2) and extending between the plurality of cores (3) adjacent in the circumferential direction of the main body (2); and an inner circumferential concavity ($G_1$) formed at a position on an inner circumferential surface of the main body (2) overlapping, in a thickness direction of the main body (2), an outer circumferential concavity ($G_2$) of each of the lugs (5). The elastic crawler device comprises: the elastic crawler (1); and a drive wheel, an idle wheel and a rolling wheel.

18 Claims, 9 Drawing Sheets

(51) Int. Cl.
*B62D 55/06* (2006.01)
*B62D 55/125* (2006.01)

(58) Field of Classification Search
USPC ....... 180/9.26; 305/158, 165, 166, 167, 170, 305/171, 177, 182, 183
See application file for complete search history.

(56) References Cited

U.S. PATENT DOCUMENTS

| | | | |
|---|---|---|---|
| 6,422,666 B2* | 7/2002 | Choi | B62D 55/24 |
| | | | 305/165 |
| 7,784,884 B2* | 8/2010 | Soucy | B62D 55/244 |
| | | | 305/171 |
| 7,841,675 B2* | 11/2010 | Choi | B62D 55/24 |
| | | | 305/165 |
| 7,883,160 B2* | 2/2011 | Kondo | B62D 55/244 |
| | | | 305/170 |
| 8,888,198 B2* | 11/2014 | Shimozono | B62D 55/253 |
| | | | 305/169 |
| 9,193,401 B2* | 11/2015 | Shimozono | B62D 55/26 |
| 9,334,000 B2* | 5/2016 | Nomizo | B62D 55/244 |
| 2008/0100134 A1* | 5/2008 | Soucy | B62D 55/244 |
| | | | 305/179 |
| 2011/0181103 A1* | 7/2011 | Shimozono | B62D 55/244 |
| | | | 305/165 |
| 2012/0146401 A1* | 6/2012 | Shimozono | B62D 55/244 |
| | | | 305/169 |

FOREIGN PATENT DOCUMENTS

| | | | |
|---|---|---|---|
| JP | 2010120549 A | | 6/2010 |
| JP | 2011046277 A | * | 3/2011 |
| JP | 2011046277 A | | 3/2011 |

\* cited by examiner

ELASTIC CRAWLER AND ELASTIC CRAWLER DEVICE

TECHNICAL FIELD

This disclosure relates to an elastic crawler and an elastic crawler device.

BACKGROUND

Conventionally known is an elastic crawler having lugs arranged on an outer circumferential surface of a main body in a manner extending in a circumferential direction between a plurality of cores arranged at a spacing in a circumferential direction of the main body (see, e.g., PTL1 (JP2010-120549A)). Such lugs have a high rigidity and excessively high spring characteristics in up-down direction, and thus are a factor of vibration occurrence. Therefore, it is known as a technique for suppressing the bending rigidity to dispose an outer circumferential concavity (recess) on the lugs (see, e.g., PTL2 (JP2011-046277A)).

CITATION LIST

Patent Literature

PTL1: JP2010-120549A
PTL2: JP2011-046277A

SUMMARY

Technical Problem

As mentioned above, by forming an outer circumferential concavity on the lugs, and thereby suppressing the bending rigidity of the lug to render the entire elastic crawler flexible, the durability of the lug is ensured, and simultaneously, the power loss during running is reduced, and even the fuel efficiency is improved.

However, as a result of further test and study, we recognized that there is still room for improving the suppression of the bending rigidity of the elastic crawler.

This disclosure aims to provide an elastic crawler and an elastic crawler device capable of achieving both the suppression of the bending rigidity and the durability.

Solution to Problem

The elastic crawler according to this disclosure comprises: an endless belt-like main body having elasticity; a plurality of cores embedded at a spacing in a circumferential direction of the main body, each of the plurality of cores having a pair of wings extending to widthwise outer sides of the main body from a central portion; a plurality of lugs, each being arranged in a manner protruding from an outer circumferential surface of the main body and extending between the plurality of cores adjacent in the circumferential direction of the main body at a spacing in the circumferential direction of the main body, and having an outer circumferential concavity between the plurality of cores adjacent in the circumferential direction; and an inner circumferential concavity formed at a position on an inner circumferential surface of the main body overlapping, in a thickness direction of the main body, the outer circumferential concavity of each of the lugs. According to the elastic crawler according to this disclosure, it is possible to achieve both the suppression of the bending rigidity and the durability.

In the elastic crawler according to this disclosure, it is preferable that a circumferential width of the inner circumferential concavity is larger than a circumferential width of the outer circumferential concavity. In this case, it is possible to further achieve the suppression of the bending rigidity.

In the elastic crawler according to this disclosure, it is preferable that a depth of the inner circumferential concavity is larger than a depth of the outer circumferential concavity. In this case, it is possible to further achieve the suppression of the bending rigidity.

In the elastic crawler according to this disclosure, it is preferable that the main body has a tension member built-in, a distance in the thickness direction between the tension member and a bottom of the inner circumferential concavity being equal to a distance in the thickness direction between the tension member and a bottom of the outer circumferential concavity. In this case, it is possible to further achieve the suppression of the bending rigidity.

The elastic crawler device according to this disclosure comprises the elastic crawler according to any one of the aforementioned aspects; and a drive wheel, an idle wheel and a rolling wheel onto which the elastic crawler is wound. According to the elastic crawler device according to this disclosure, it is possible to achieve both the suppression of the bending rigidity and the durability.

Advantageous Effect

This disclosure is capable of providing an elastic crawler and an elastic crawler device capable of achieving both the suppression of the bending rigidity and the durability.

DETAILED DESCRIPTION

Figure 1:
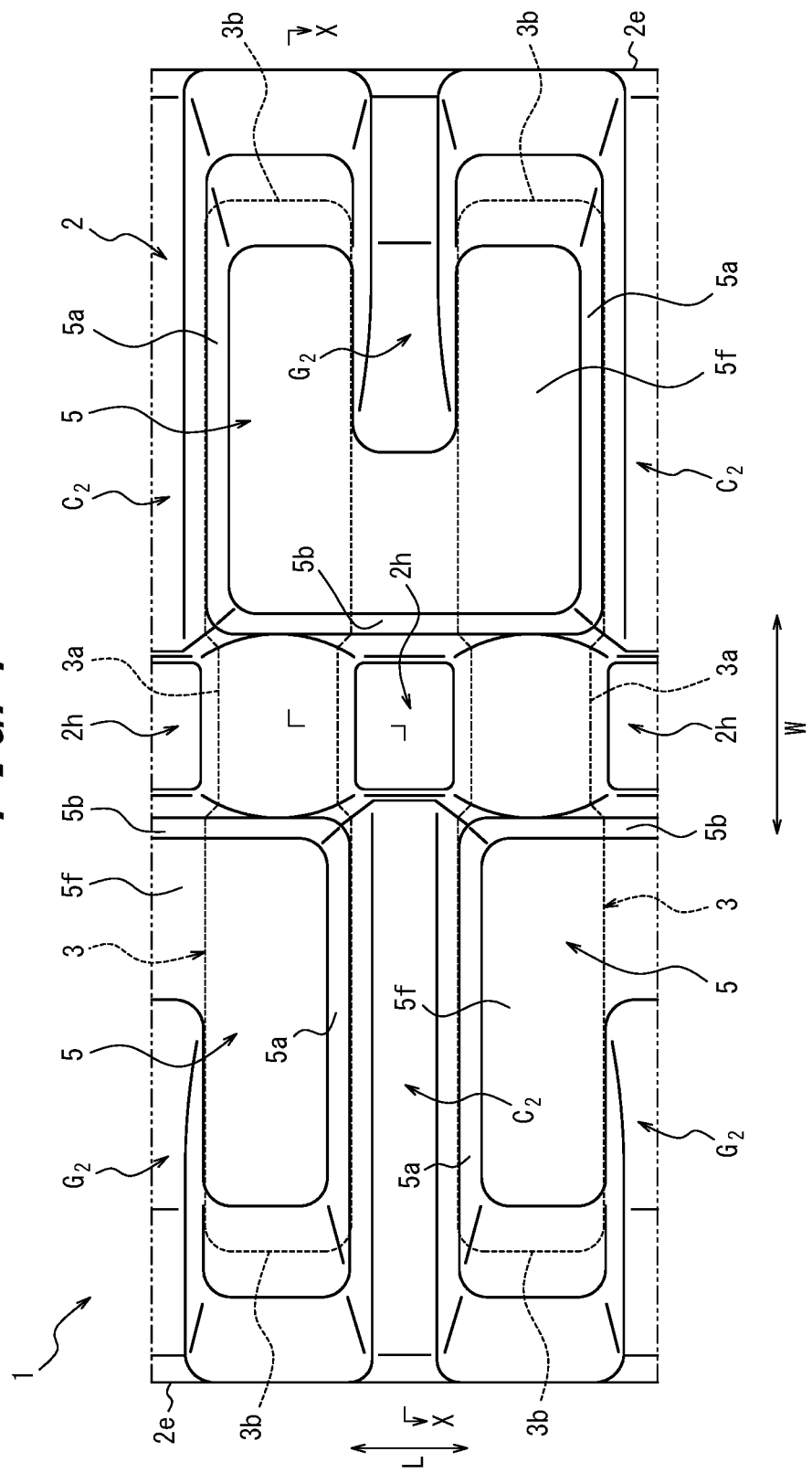
FIG. 1 is a plan view partially illustrating an outer circumferential surface side of the elastic crawler according to the first embodiment of this disclosure.

In the following, the elastic crawler and the elastic crawler device according to one embodiment of this disclosure is described by referring to the drawings.

In FIGS. 1 to 5, reference sign 1 is the elastic crawler according to the first embodiment of this disclosure. The elastic crawler 1 includes an endless belt-like crawler main body (main body) 2 having elasticity. In the present embodiment, the crawler main body 2 is constituted with a rubber material. In the following description, the reference sign W is a width direction of the crawler main body 2 (hereinafter referred to as merely "the width direction"). Moreover, the reference sign L is a circumferential direction of the crawler main body 2 (hereinafter referred to as merely "the circumferential direction"). Further, the reference sign D is the thickness direction of the crawler main body (hereinafter referred to as merely "the thickness direction"). Here, the thickness direction refers to a direction of a perpendicular line when the crawler main body 2 is stretched horizontally.

Figure 4:
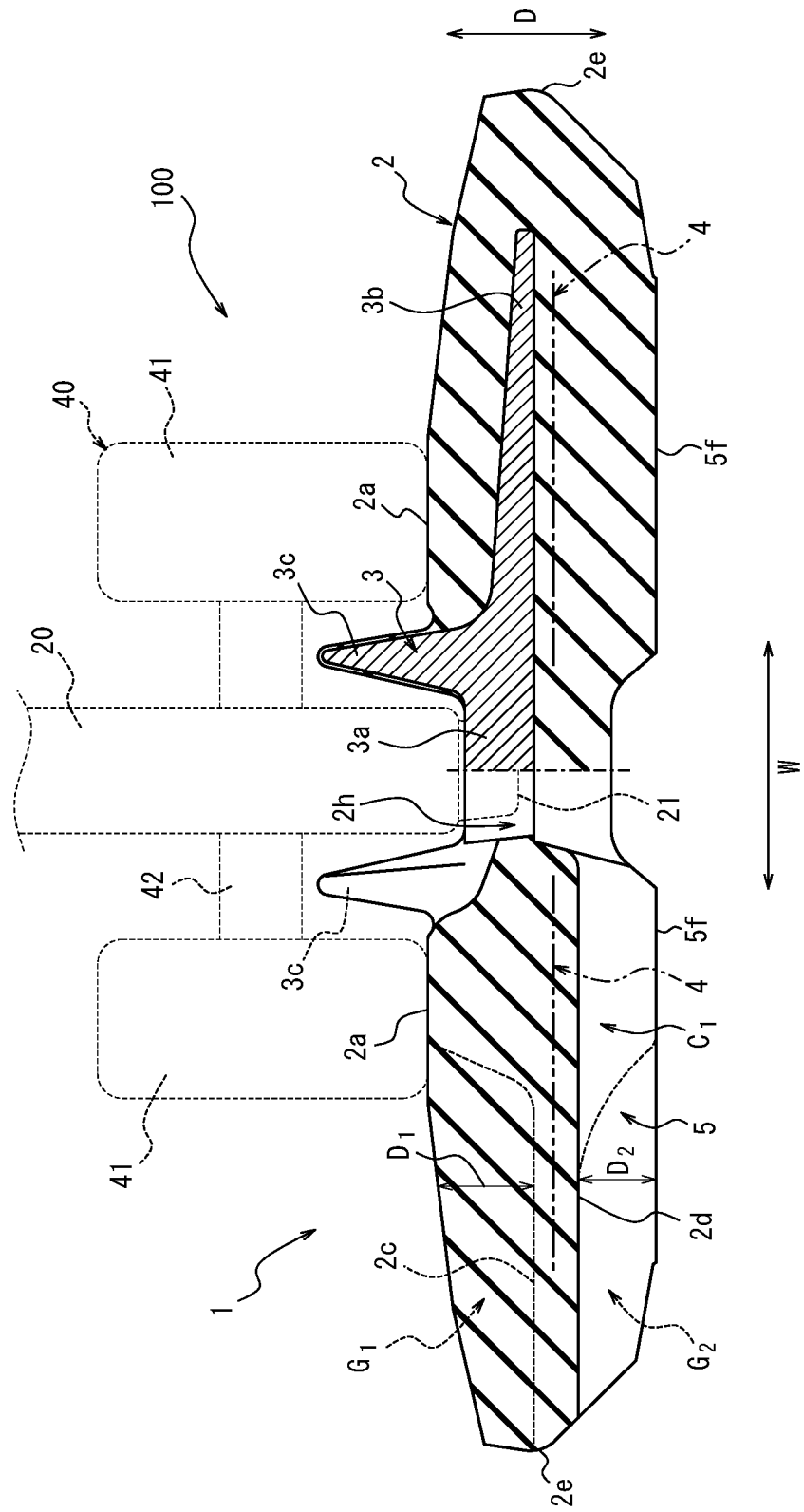
FIG. 4 is an X-X cross-sectional view of FIGS. 1 and 2, and exemplifies the elastic crawler mechanism according to an embodiment of this disclosure.

The elastic crawler 1 includes a plurality of cores 3. In the present embodiment, as illustrated with dashed line in FIG. 1 and FIG. 2, the plurality of cores 3 are embedded in the crawler main body 2 at a spacing in the circumferential direction. The cores 3 respectively have a pair of wings 3b extending to a widthwise outer side from a central portion 3a. Moreover, as illustrated in FIG. 2 and FIG. 4, the central portion 3a of the cores 3 has a pair of projections 3c arranged at a spacing in the width direction of the crawler main body 2. In the present embodiment, as illustrated in FIG. 4, a main cord layer 4 is arranged on an outer circumferential surface side (the lower side in the drawing) of the crawler main body 2 of the wings 3b of the cores 3. The main cord layer 4 is formed by, e.g., arranging a plurality of tension members (e.g., steel cords) circling the crawler main body 2 at a spacing in the width direction.

Figure 2:
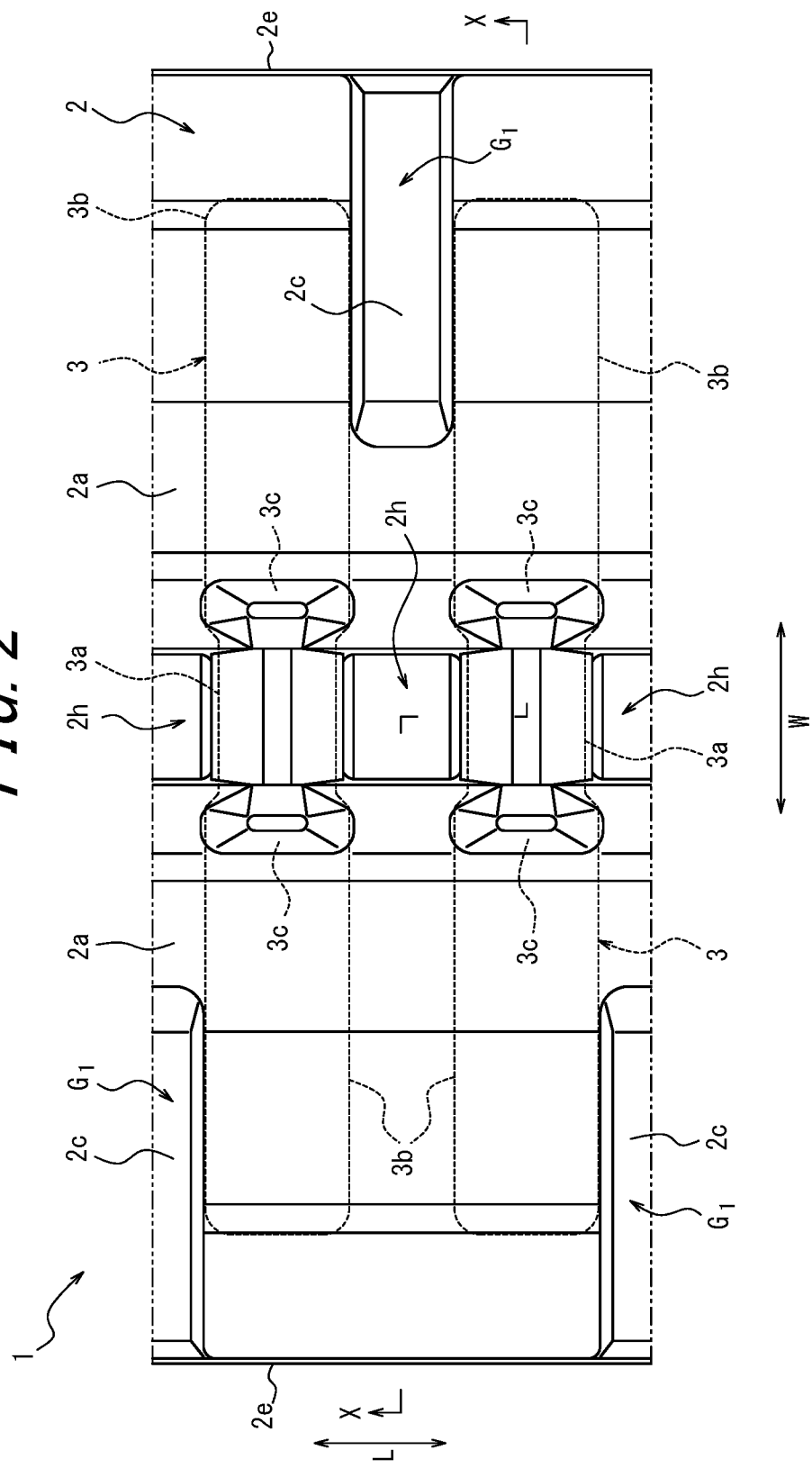
FIG. 2 is a plan view partially illustrating an inner circumferential surface side of the elastic crawler of FIG. 1.

Further, as illustrated in FIG. 1, the elastic crawler 1 includes a plurality of lugs 5. The lugs 5 are respectively formed on the outer circumferential surface of the crawler main body 2. Specifically, the lugs 5 have a flat contact end surface 5f protruding from the outer circumferential surface of the crawler main body 2. The lugs 5 are respectively arranged at a spacing in the circumferential direction. In the present embodiment, the lugs 5 are constituted with an elastic material such as rubber and the like. Moreover, in the present embodiment, the lugs 5 are respectively arranged at a spacing in the width direction sandwiching an engaging portion 2h disposed on the crawler main body 2, which is mentioned below. Moreover, the lugs 5 arranged on both widthwise sides of the crawler main body 2 sandwiching the engaging portion 2h respectively form a gap $C_2$ in the circumferential direction.

The lugs 5 are arranged in a manner extending between a plurality of cores 3 adjacent in the circumferential direction. In the present embodiment, one lug 5 is arranged in a manner extending between two cores 3 adjacent in the circumferential direction. Further, in the present embodiment, in a planar view such as FIG. 1, the lugs 5 arranged on both widthwise sides sandwiching the engaging portion 2h are arranged at positions displaced from each other in the circumferential direction at a spacing of one core 3 in the circumferential direction. In addition, each of the lugs 5 is located between of a plurality of cores 3 adjacent in the circumferential direction, and has an outer circumferential concavity $G_2$ at a position corresponding to a space between each of the cores 3.

In the present embodiment, the outer circumferential concavity $G_2$ is a concavity such as groove, cavity and the like formed in a manner cutting out the widthwise outer side of the contact end surface 5f. The lugs 5 are constituted by two widthwise extending portions 5a extending to the widthwise outer side, and a circumferential connecting portion 5b connecting these widthwise extending portions 5a in the circumferential direction. Namely, in the present embodiment, the lugs 5 are shaped into a U-shape with an outline shape in a planar view on the outer circumferential side with an opened widthwise outer side. Specifically, the two widthwise extending portions 5a respectively overlap in the thickness direction a part of the crawler main body 2 with the wings 3b of the cores 3 embedded (hereinafter referred to as the core-embedded part), and the circumferential connecting part 5b overlap in the thickness direction a part of the crawler main body 2 located between each of the plurality of cores 3 in the circumferential direction.

As illustrated in FIG. 2, a rolling wheel rolling surface 2a is formed on the inner circumferential surface of the crawler main body 2. The rolling wheel rolling surface 2a is formed in a manner extending in the circumferential direction and circling the crawler main body 2. In the present embodiment, a pair of rolling wheel rolling surfaces 2a are formed on a central side in the width direction at a spacing in the width direction. As illustrated in FIG. 4, the rolling wheel rolling surfaces 2a respectively constitute a flat surface.

Figure 3:
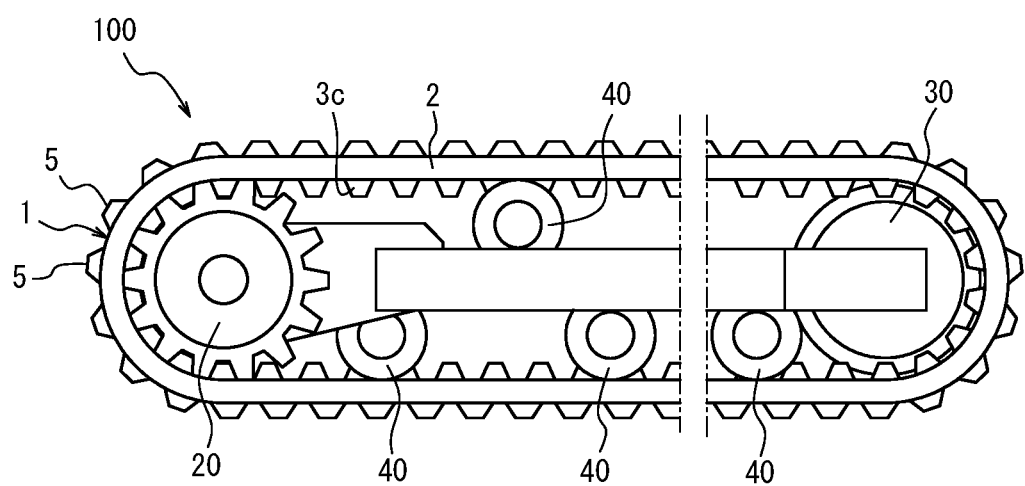
FIG. 3 is a side view illustrating the elastic crawler device according to an embodiment of this disclosure using the elastic crawler of FIG. 1.

Moreover, in FIG. 3, the reference sign 100 is an elastic crawler device according to the first embodiment of this disclosure, and the reference sign 20 is a sprocket constituting the elastic crawler device 100. Moreover, the reference sign 30 is an idler constituting the elastic crawler device 100. In the present embodiment, the sprocket 20 constitutes a drive wheel for driving the elastic crawler 1, and the idler 30 constitutes an idle wheel rotating following the elastic crawler 1.

As illustrated in FIG. 4, a tooth 21 of the sprocket 20 is engaged with the engaging portion 2h disposed on the crawler main body 2, and drives the elastic crawler 1. In the present embodiment, the engaging portion 2h is constituted by a through hole penetrating the crawler main body 2 in the thickness direction, but may also be a cavity without penetrating the crawler main body 2 in the thickness direction. The idler 30 rotates on the inner circumferential surface of the crawler main body 2, and rotates in accordance with the advance of the elastic crawler 1 driven by the sprocket 20. In the present embodiment, the idler 30 consists of one rotor, and the rolling wheel rotates on the inner circumferential surface of the crawler main body 2 between each of the projections 3c of the cores 3 in the width direction, but it is also possible to select idlers of various configuration as the idler 30 as long as rolling on the inner circumferential surface of the crawler main body 2, such as a configuration such that the idler 30 has three rotors rolling on two rolling wheel rolling surfaces 2a in addition to rolling between each of the projections 3c of the cores 3 in the width direction, a configuration such that two rotors rotate on the rolling wheel rolling surface 2a, and the like.

The reference sign 40 is a rolling wheel constituting the elastic crawler device 100. Among the elastic crawler 1, the rolling wheel 40 rotates on the rolling wheel rolling surface 2a formed on the inner circumferential surface of the crawler main body 2. In the present embodiment, the rolling wheel 40 has two rotors 41 connected via a shaft 42. Thereby, as illustrated with dashed line in FIG. 4, the two rolling wheel rolling surfaces 2a respectively have a rolling wheel 40 rotating thereon when driving the elastic crawler 1. Further, in FIG. 4, the correlation between the elastic crawler 1, the sprocket 20 and the rolling wheel 40 when seen in the circumferential direction is illustrated with dashed line in the same drawing.

The crawler main body 2 has an inner circumferential concavity $G_1$ on its inner circumferential surface. The inner circumferential concavity $G_1$ is a concavity such as groove, cavity and the like disposed on the crawler main body 2. In the present embodiment, as illustrated in FIG. 2, the inner circumferential concavity $G_1$ is formed at a position corresponding to the outer circumferential concavity $G_2$ of the lugs 5 by being arranged at a spacing in the circumferential direction. Specifically, in the planar view of FIG. 2, the inner circumferential concavity $G_1$ may have at least a part of the inner circumferential concavity $G_1$ arranged between each two cores 3 in the circumferential direction. Namely, the inner circumferential concavity $G_1$ may have at least a part of the inner circumferential concavity $G_1$ arranged at a position overlapping in the thickness direction the outer circumferential concavity $G_2$ of the lugs 5. In the present embodiment, the inner circumferential concavity $G_1$ is arranged between each two cores 3 in the circumferential direction. Namely, the inner circumferential concavity $G_1$ is arranged at a position overlapping in the thickness direction the outer circumferential concavity $G_2$ of the lugs 5. More specifically, the inner circumferential concavity $G_1$ extend between each of the wings 3b of two cores 3 adjacent in the circumferential direction, from the rolling wheel rolling surface 2a to the widthwise outer side.

In the present embodiment, as illustrated in FIG. 2, the inner circumferential concavities $G_2$ respectively extend at a constant circumferential width of the outline shape in planar view from the widthwise inner side to the outer side. Further, in the present embodiment, the inner circumferential concavities $G_1$ are respectively formed in a line with the engaging portion 2h in the width direction. Namely, the inner circumferential concavities $G_1$ are respectively formed at a position identical to the engaging portion 2h in the circumferential direction.

In the present embodiment, the inner circumferential concavities $G_1$ arranged on both widthwise sides sandwiching the engaging portion 2h are respectively arranged alternatively in the circumferential direction in a manner corresponding to the outer circumferential concavities $G_2$ of the lugs 5. Therefore, the inner circumferential concavities $G_1$ and the outer circumferential concavities $G_2$ respectively collaborate with each other, and render the elastic crawler 1 sufficiently flexible. In this case, when driving the elastic crawler 1, the elastic crawler 1 is likely to become flexible at positions where the inner circumferential concavity $G_1$ and the outer circumferential concavity $G_2$ overlap in the thickness direction, which reduces the power loss when running, and enables improvement of the fuel efficiency. Moreover, in the present embodiment, as illustrated in FIG. 1, the outer circumferential concavity $G_2$ of the lugs 5 is formed in a manner with a part of the lugs 5 remaining (the circumferential connection portion 5b), and thus is capable of ensuring the durability of the lugs 5. Further, by arranging the inner circumferential concavity $G_1$ at a position overlapping in the thickness direction the outer circumferential concavity $G_2$ of the lugs 5, it is possible to reduce the bending resistance (bending rigidity) of the entire elastic crawler 1, even if the thickness of the elastic crawler 1 within a part other than the inner circumferential concavity $G_1$ and the outer circumferential concavity $G_2$ is increased to improve the durability of said part (e.g., the durability against cutting damage and jumping out of the cores). Therefore, it is possible to ensure the durability and simultaneously reduce the bending resistance effectively.

Therefore, according to the elastic crawler 1 according to the present embodiment, it is possible to achieve both the suppression of the bending rigidity (reduction of the bending resistance of the elastic crawler 1) and the durability. Moreover, according to the elastic crawler device 100 according to the present embodiment, by including the elastic crawler 1, it is possible to achieve both the suppression of the bending rigidity and the durability. Further, in the present embodiment, the inner circumferential concavities $G_1$ arranged on both widthwise sides sandwiching the engaging portion 2h are respectively arranged alternatively in the circumferential direction in a manner corresponding to the outer circumferential concavities $G_2$ of the lugs 5, but may also be arranged symmetrically on both widthwise sides sandwiching the engaging portion 2h. Namely, the inner circumferential concavities $G_1$ may be arranged between each core 3 of the crawler main body 2 in the circumferential direction.

Figure 5:
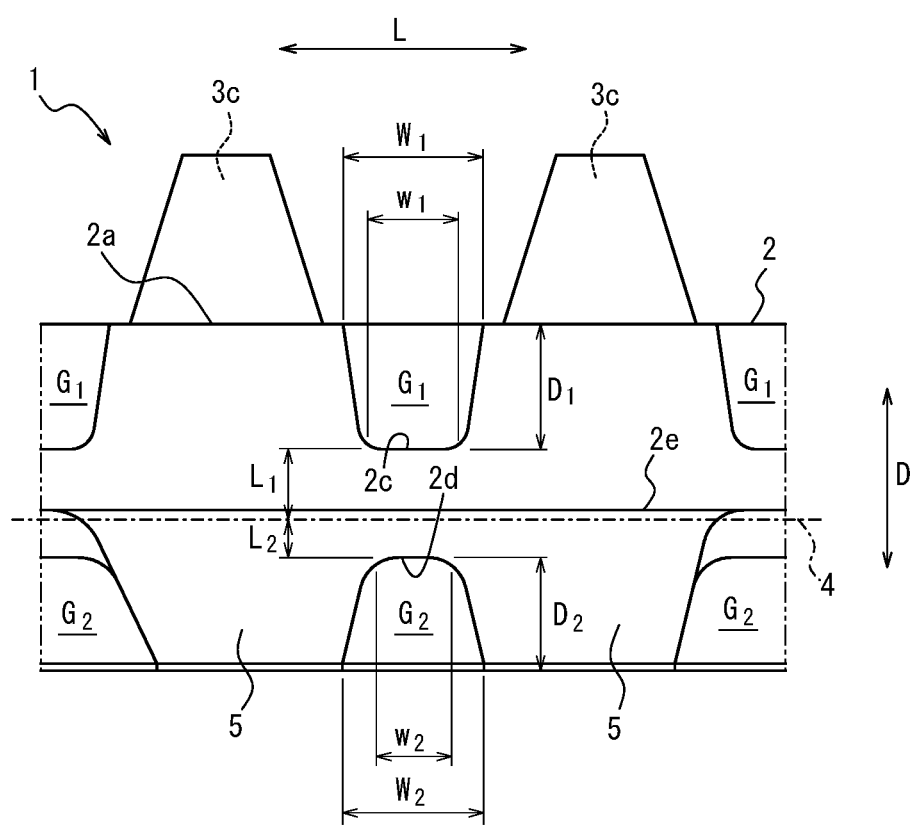
FIG. 5 is a right side view of FIG. 2.

Here, FIG. 5 is a right side view of FIG. 2.

As illustrated in FIG. 5, in the present embodiment, the crawler main body 2 has a circumferential width of the inner circumferential concavity $G_1$ larger than the circumferential width of the outer circumferential concavity $G_2$. In the present embodiment, the circumferential maximum width $W_1$ and the circumferential minimum width $w_1$ of the inner circumferential concavity $G_1$ are respectively larger than the circumferential maximum width $W_2$ and the circumferential minimum width $w_2$ of the outer circumferential concavity $G_2$. Namely, the circumferential width of the inner circumferential concavity $G_1$ satisfies the following conditions.

$$W_2 \leq W_1 \text{ and } w_2 \leq w_1 \tag{1}$$

In this case, it is possible to further achieve both the suppression of the bending rigidity and the durability. It is more effective if the circumferential width of the inner circumferential concavity $G_1$ is larger than the circumferential width of the outer circumferential concavity $G_2$. This is because that when wound onto the elastic crawler 1, the rubber around the inner circumferential concavity $G_1$ is compressed and swells, and if the circumferential width of the inner circumferential concavity $G_1$ is small, the swelled rubber on the circumferential side surface of the inner circumferential concavity $G_1$ contact each other, which increases the bending resistance. Therefore, a larger circumferential width of the inner circumferential concavity $G_1$ is capable of reducing the bending resistance.

Moreover, as illustrated in FIG. 5, in the present embodiment, the crawler main body 2 has a depth $D_1$ of the inner circumferential concavity $G_1$ larger than the depth $D_2$ of the outer circumferential concavity $G_2$, i.e., satisfies the following condition.

$$D_2 \leq D_1 \tag{2}$$

In this case, it is possible to further achieve both the suppression of the bending rigidity and the durability. It is more effective if the depth $D_1$ of the inner circumferential concavity $G_1$ is larger than the depth $D_2$ of the outer circumferential concavity $G_2$. This is also because that when wound onto the elastic crawler 1, the rubber around the inner circumferential concavity $G_1$ is compressed and swells, and if the depth of the inner circumferential concavity $G_1$ is small, the swelled rubber on the bottom is likely to contact the swelled rubber on the circumferential side surface of the inner circumferential concavity $G_1$, which increases the bending resistance. Therefore, a larger depth of the inner circumferential concavity $G_1$ is capable of reducing the bending resistance. Here, as illustrated in FIG. 4, in the present embodiment, the depth $D_1$ of the inner circumferential concavity $G_1$ is a distance in the thickness direction between the inner circumferential surface of the crawler main body 2 and a bottom surface 2c of the inner circumferential concavity $G_1$ parallel to the main cord layer 4 along the width direction. Further, the outline shape in the cross sectional view of FIG. 4 of the inner circumferential surface of the crawler main body 2 here is a surface represented with the rolling wheel rolling surface 2a and the outline shape continuous from the rolling wheel rolling surface 2a to the widthwise outer side. Moreover, in the present embodiment, the depth $D_2$ of the outer circumferential concavity $G_2$ is a distance in the thickness direction between the contact end surface 5f and a bottom surface 2d of the outer circumferential concavity $G_2$ parallel to the contact end surface 5f along the width direction.

As illustrated in FIG. 5, in the present embodiment, the crawler main body 2 has a main cord layer 4 built-in, a distance $L_1$ in the thickness direction between the main cord layer 4 and the bottom surface 2c of the inner circumferential concavity $G_1$ being equal to a distance $L_2$ in the thickness direction between the main cord layer 4 and the bottom surface 2d of the outer circumferential concavity $G_2$, i.e., satisfies the following condition.

$$L_2 = L_1 \quad (3)$$

In this case, it is possible to further achieve both the suppression of the bending rigidity and the durability. If the distance from the tension member (steel cords) to the bottom of the concavity is approximately equal as for the inner circumferential concavity $G_1$ and the outer circumferential concavity $G_2$, the effect of bending resistance reduction becomes maximum. This is because that if only increasing the depth of one, the bending resistance of the one with a larger distance from the tension member to the bottom of the concavity would be affected greatly. Therefore, if approximately equal, it is possible to simultaneously ensure the rubber thickness, ensure the durability, and achieve the effect of bending resistance reduction. Here, the distance $L_1$ in the thickness direction is the distance in the thickness direction between a line connecting the central axis of the tension member (the two-dot chain line in FIG. 4) and the bottom surface 2c of the inner circumferential concavity $G_1$ when the main cord layer 4 is arranged in the width direction horizontally. Moreover, the distance $L_2$ in the thickness direction is the distance in the thickness direction between the line connecting the central axis of the tension member (the two-dot chain line in FIG. 4) and the bottom surface 2d of the outer circumferential concavity $G_2$ when the main cord layer 4 is arranged in the width direction horizontally. Further, "the distance $L_1$ in the thickness direction being equal to the distance $L_2$ in the thickness direction" not only refers to that the distance $L_1$ in the thickness direction is completely equal to the distance $L_2$ in the thickness direction, but is also inclusive of the case that, e.g., a difference error between the distance $L_1$ in the thickness direction and the distance $L_2$ in the thickness direction is within a range that $0.9 \text{ mm} \leq L_1/L_2 \leq 1.1 \text{ mm}$.

In FIGS. 6 to 10, reference sign 10 is the elastic crawler according to the second embodiment of this disclosure. In the present embodiment, in a planar view such as FIG. 6, the lugs 5 are of a shape displaced from each other in the circumferential direction, such that the lugs 5 are curved toward the widthwise outer side. Specifically, regarding the lugs 5, a part on the widthwise inner side is arranged in a manner extending between a plurality of (two in the present embodiment) cores 3 adjacent in the circumferential direction, while a part on the widthwise outer side is arranged in a manner extending between a plurality of (two in the present embodiment) adjacent cores 3 when displaced by one core 3 in the circumferential direction.

In addition to an outer circumferential concavity arranged on the widthwise outer side (hereinafter referred to as the "first outer circumferential concavity") $G_2$, the present embodiment has an outer circumferential concavity (hereinafter referred to as the "second outer circumferential concavity") $G_3$ on the widthwise inner side. The second outer circumferential concavity $G_3$ is a concavity such as groove, cavity and the like formed in a manner cutting out the contact end surface 5f similarly as the first outer circumferential concavity $G_2$. Similarly as the first embodiment, the lugs 5 are basically constituted by two widthwise extending portions 5a extending to the widthwise outer side, and a circumferential connecting portion 5b connecting these widthwise extending portions 5a in the circumferential direction.

Namely, in the present embodiment, the lugs 5 are shaped into a lateral H-shape with an outline shape in a planar view on the outer circumferential side with opened widthwise outer and inner sides. Specifically, the two widthwise extending portions 5a respectively have an inner end portion $5a_1$ overlapping in the thickness direction the rolling wheel rolling surface 2a on the inner circumferential surface side of the crawler main body 2, and an outer end portion $5a_2$ overlapping, in the thickness direction, the core-embedded part of the crawler main body 2, and respectively extend in the width direction. Further, similarly as the first embodiment, the first outer circumferential concavity $G_2$ and the second outer circumferential concavity $G_3$ disposed on the lugs 5 respectively overlap in the thickness direction of the crawler main body 2 the inner circumferential concavity $G_1$ formed on the inner circumferential surface of the crawler main body 2. Therefore, the outer circumferential concavity $G_2$ and the second outer circumferential concavity $G_3$ respectively collaborate with the inner circumferential concavity $G_1$ formed on the inner circumferential surface of the crawler main body 2, and render the elastic crawler 10 sufficiently flexible.

Figure 7:
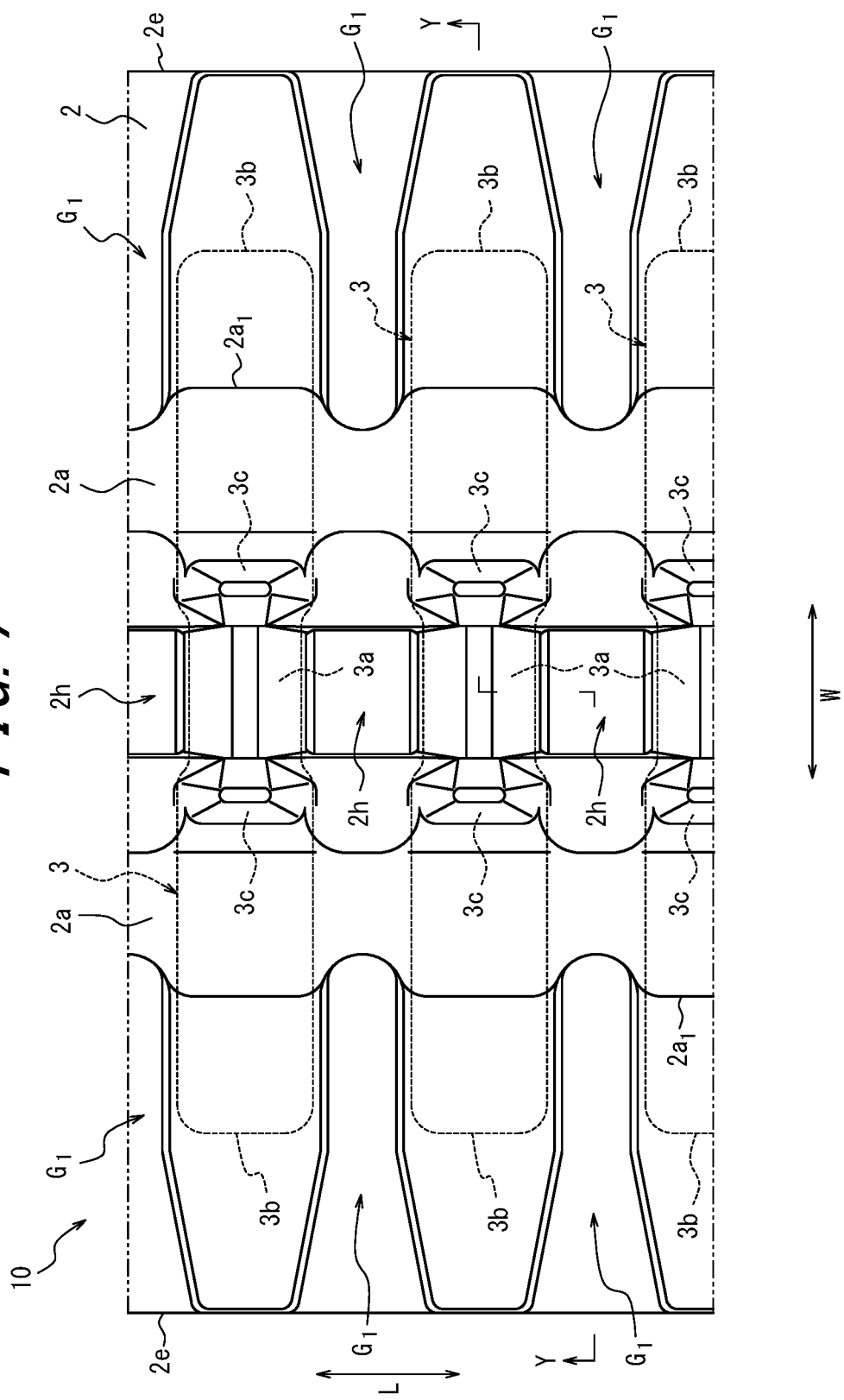
FIG. 7 is a plan view partially illustrating an inner circumferential surface side of the elastic crawler of FIG. 6.

In the present embodiment, as illustrated in FIG. 7, the inner circumferential concavity $G_1$ disposed on the inner circumferential surface of the crawler main body 2 is arranged at each position between the core-embedded parts in the circumferential direction in the crawler main body 2. More specifically, as illustrated in FIG. 7, the inner circumferential concavities $G_1$ respectively have a shape such that the circumferential width of the inner circumferential concavity $G_1$ is enlarged from a widthwise outermost end $2a_1$ of the rolling wheel rolling surface 2a formed on the inner circumferential surface of the crawler main body 2 toward a widthwise end edge 2e of the crawler main body 2.

In the present embodiment, the inner circumferential concavities $G_1$ are respectively arranged on the inner circumferential surface of the crawler main body 2 in a manner corresponding to each first outer circumferential concavities $G_2$ and the second outer circumferential concavities $G_3$ of the lugs 5. Therefore, the inner circumferential concavity $G_1$ disposed on the inner circumferential surface of the crawler main body 2 and the first outer circumferential concavity $G_2$ and the second outer circumferential concavity $G_3$ disposed on the lugs 5 respectively collaborate with each other, and renders the elastic crawler 1 sufficiently flexible. In this case, when driving the elastic crawler 10, since the crawler main body 2 becomes flexible at the positions of the first outer circumferential concavity $G_2$ and the second outer circumferential concavity $G_3$ overlapping the inner circumferential concavity $G_1$, which reduces the power loss when running, and enables improvement of the fuel efficiency. Moreover, in the present embodiment as well, as illustrated in FIG. 1, the outer circumferential concavity $G_2$ of the lugs 5 is formed in a manner with a part of the lugs 5 remaining (the circumferential connection portion 5b), and thus is capable of ensuring the durability of the lugs 5.

Therefore, according to the elastic crawler 10 according to the present embodiment, it is possible to achieve both the suppression of the bending rigidity and the durability. Moreover, according to the elastic crawler 100 including the elastic crawler device 10, it is possible to achieve both the suppression of the bending rigidity and the durability.

Figure 6:
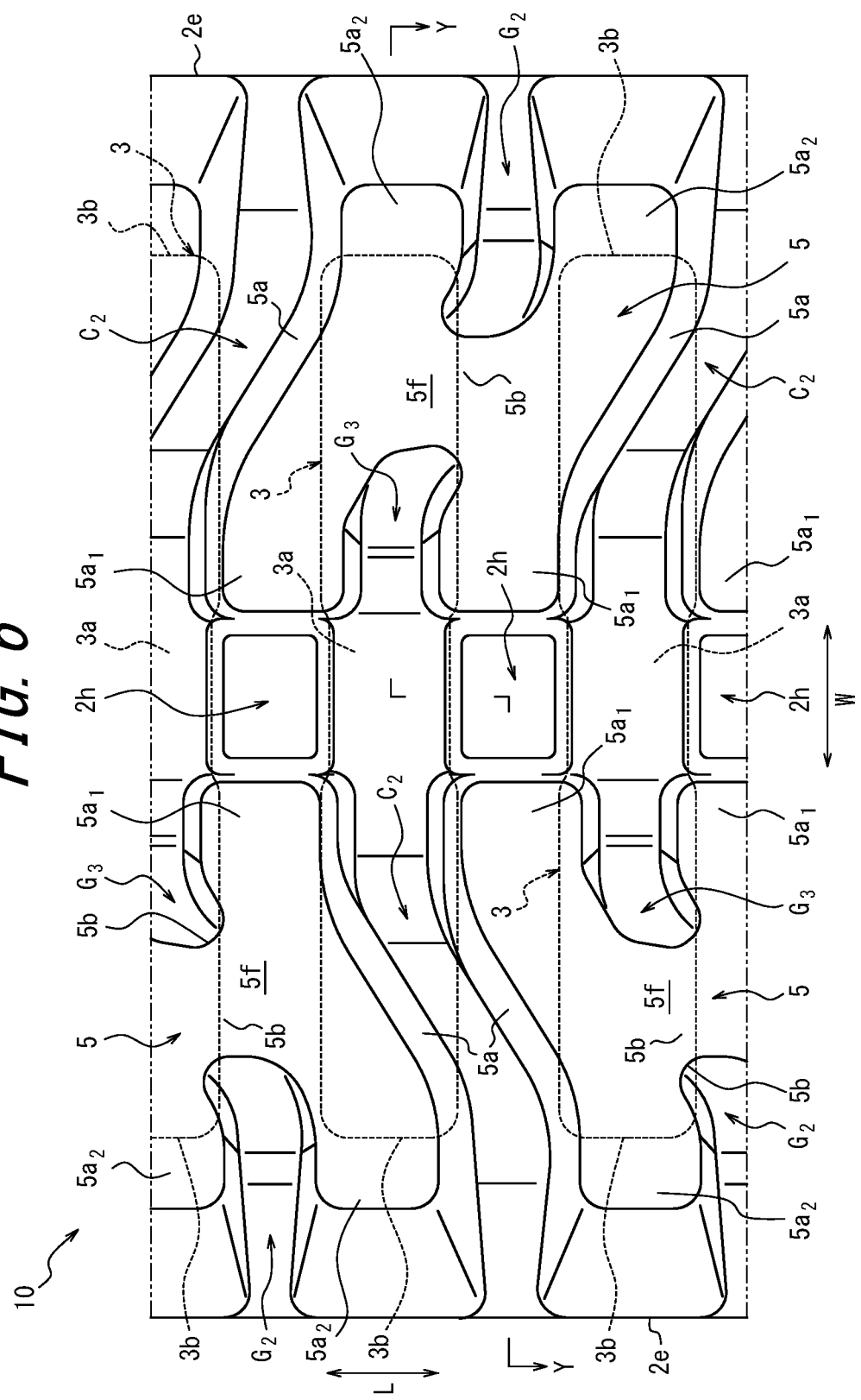
FIG. 6 is a plan view partially illustrating an outer circumferential surface side of the elastic crawler according to the second embodiment of this disclosure.

Specifically, in the present embodiment, as illustrated in FIG. 7, the inner circumferential concavity $G_1$ is arranged at each position between the core-embedded parts in the crawler main body 2 in the circumferential direction. In this case, a gap $C_2$ between the plurality of lugs 5 in the circumferential direction as illustrated in FIG. 6 overlaps in the thickness direction the space between the core-embedded parts in the crawler main body 2 in the circumferential direction. Therefore, the inner circumferential concavity $G_1$ of the crawler main body 2 and the gap $C_2$ between the lugs 5 collaborate with each other, and renders the elastic crawler 1 sufficiently flexible.

Figure 9:
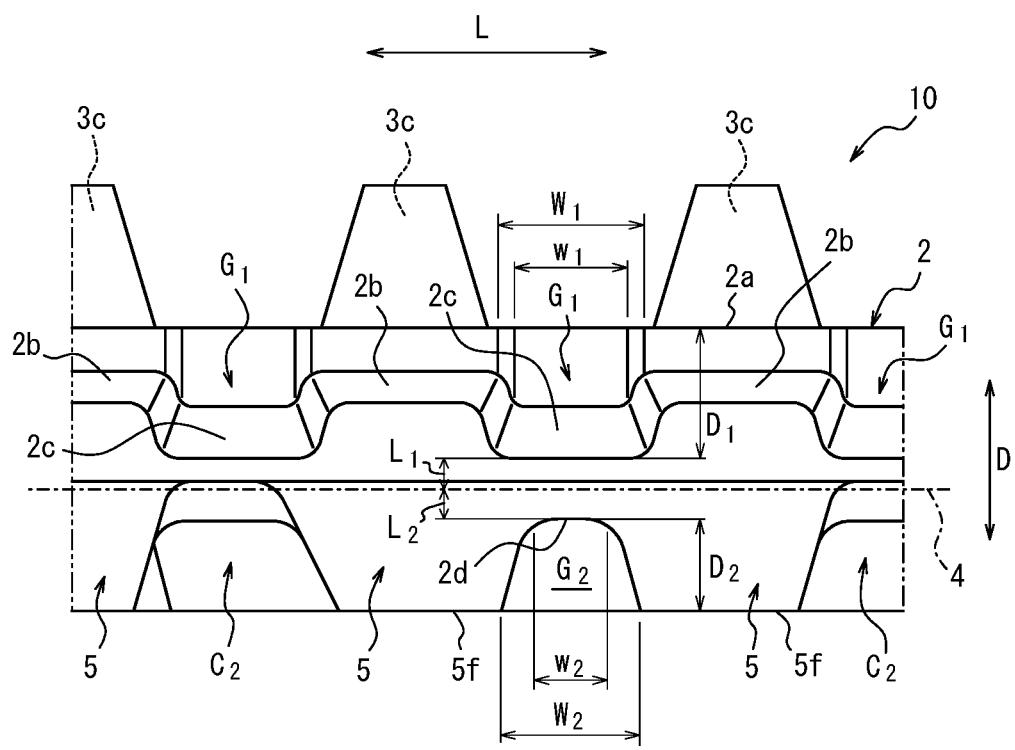
FIG. 9 is a right side view of FIG. 7.

Here, FIG. 9 is a right side view of FIG. 7.

As illustrated in FIG. 9, in the present embodiment, the crawler main body 2 has a circumferential width of the inner circumferential concavity $G_1$ larger than the circumferential width of the first outer circumferential concavity $G_2$. In the present embodiment, the circumferential maximum width $W_1$ and the circumferential minimum width $w_1$ of the inner circumferential concavity $G_1$ are respectively larger than the circumferential maximum width $W_2$ and the circumferential minimum width $w_2$ of the first outer circumferential concavity $G_2$. Namely, the circumferential width of the inner circumferential concavity $G_1$ satisfies the following conditions.

$$W_2 \leq W_1 \text{ and } w_2 \leq w_1 \quad (1)$$

In this case, it is possible to further achieve both the suppression of the bending rigidity and the durability. Further, the same goes with the correlation between the inner circumferential concavity $G_1$ and the second outer circumferential concavity $G_3$.

As illustrated in FIG. 9, in the present embodiment, the crawler main body 2 has a depth $D_1$ of the inner circumferential concavity $G_1$ larger than the depth $D_2$ of the first outer circumferential concavity $G_2$, i.e., satisfies the following condition.

$$D_2 \leq D_1 \quad (2)$$

Figure 8:
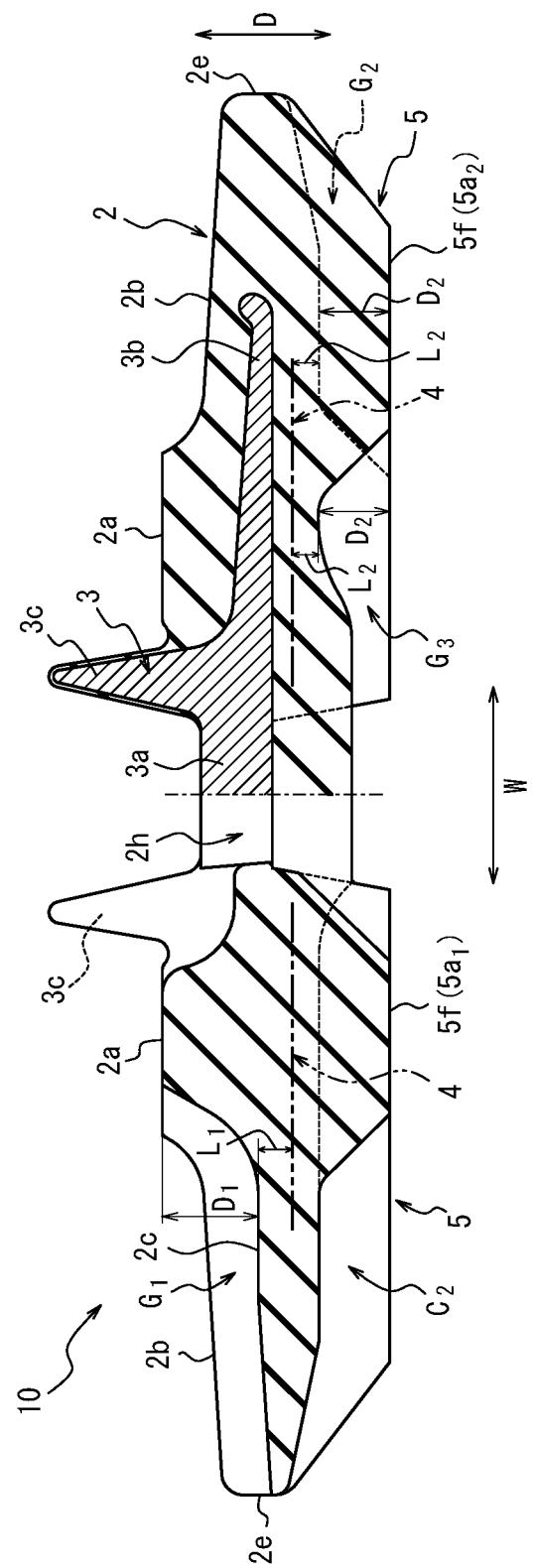
FIG. 8 is a Y-Y cross-sectional view of FIGS. 6 and 7.

In this case, it is possible to further achieve both the suppression of the bending rigidity and the durability. Here, as illustrated in FIG. 8, in the present embodiment, the depth $D_1$ of the inner circumferential concavity $G_1$ is a distance in the thickness direction between the rolling wheel rolling surface $2a$ of the crawler main body 2 and the bottom surface $2c$ of the inner circumferential concavity $G_1$ parallel to this rolling wheel rolling surface $2a$ along the width direction. Moreover, in the present embodiment, the depth $D_2$ of the first outer circumferential concavity $G_2$ is a distance in the thickness direction between the contact end surface $5f$ and the bottom surface $2d$ of the outer circumferential concavity $G_2$ parallel to the contact end surface $5f$ along the width direction. Further, the same goes with the correlation between the inner circumferential concavity $G_1$ and the second outer circumferential concavity $G_3$.

As illustrated in FIG. 9, in the present embodiment, the crawler main body 2 has a main cord layer 4 built-in, a distance $L_1$ in the thickness direction between the main cord layer 4 and the bottom surface $2c$ of the inner circumferential concavity $G_1$ being equal to a distance $L_2$ in the thickness direction between the main cord layer 4 and the bottom surface $2d$ of the first outer circumferential concavity $G_2$, i.e., satisfies the following condition.

$$L_2 = L_1 \quad (3)$$

In this case, it is possible to further achieve both the suppression of the bending rigidity and the durability. Here, the distance $L_1$ in the thickness direction is the distance in the thickness direction from a line connecting the central axis of the tension member (the two-dot chain line in FIG. 8) and the bottom surface $2c$ of the inner circumferential concavity $G_1$ when the main cord layer 4 is arranged in the width direction horizontally. Moreover, the distance $L_2$ in the thickness direction is the distance in the thickness direction between the line connecting the central axis of the tension member (the two-dot chain line in FIG. 8) and the bottom surface $2d$ of the outer circumferential concavity $G_2$ when the main cord layer 4 is arranged in the width direction horizontally. Further, the same goes with the correlation between the inner circumferential concavity $G_1$ and the second outer circumferential concavity $G_3$.

As mentioned above, this disclosure is capable of providing an elastic crawler and an elastic crawler device capable of achieving both the suppression of the bending rigidity and the durability.

INDUSTRIAL APPLICABILITY

This disclosure may be used in an elastic crawler and an elastic crawler device including: an endless belt-like main body having elasticity; a plurality of cores which have a pair of wings extending to a widthwise outer side of the main body from a central portion, and are embedded at a spacing in a circumferential direction of the main body; a plurality of lugs which protrude from an outer circumferential surface of the main body, and are arranged in a manner at a spacing in the circumferential direction of the main body.

REFERENCE SIGNS LIST 1 elastic crawler
2 crawler main body (main body)
$2a$ rolling wheel rolling surface
$2c$ bottom surface of inner circumferential concavity $G_1$
$2d$ bottom surface of outer circumferential concavity
3 core
$3a$ central portion
$3b$ wing
$3c$ projection
4 main cord layer (tension member)
5 lug
$5a$ widthwise extending portion
$5b$ circumferential connecting portion
$5f$ contact end portion
20 sprocket (drive wheel)
30 idler (idle wheel)
40 rolling wheel
$G_1$ inner circumferential concavity
$C_2$ gap
$G_2$ first outer circumferential concavity (outer circumferential concavity)
$G_3$ second outer circumferential concavity (outer circumferential concavity)
D crawler main body in thickness direction (thickness direction)
L crawler main body in circumferential direction (circumferential direction)
W crawler main body in width direction (width direction)
$W_1$ circumferential maximum width of inner circumferential concavity
$w_1$ circumferential minimum width of inner circumferential concavity $W_2$ circumferential maximum width of outer circumferential concavity
$w_2$ circumferential minimum width of outer circumferential concavity
$D_1$ depth of inner circumferential concavity
$D_2$ depth of outer circumferential concavity
$L_1$ distance in thickness direction between main cord layer and bottom surface of inner circumferential concavity
$L_2$ distance in thickness direction between main cord layer and bottom surface of outer circumferential concavity

The invention claimed is:

1. An elastic crawler comprising:
an endless belt main body having elasticity;
a plurality of cores embedded at a spacing in a circumferential direction of the main body, each of the plurality of cores having a pair of wings extending to widthwise outer sides of the main body from a central portion and a pair of projections arranged in the central portion and spaced from each other in a width direction of the main body;
a plurality of lugs, each being arranged in a manner protruding from an outer circumferential surface of the main body and extending between the plurality of cores adjacent in the circumferential direction of the main body at a spacing in the circumferential direction of the main body, and having an outer circumferential concavity between the plurality of cores adjacent in the circumferential direction; and
an inner circumferential concavity formed at a position on an inner circumferential surface of the main body overlapping, in a thickness direction of the main body, the outer circumferential concavity of each of the lugs, wherein
a pair of rolling wheel rolling surfaces are formed on the inner circumferential surface of the main body on the widthwise outer sides with respect to the pair of projections and are each formed in a manner extending continuously in the circumferential direction over an entire circumference of the main body and circling the main body, the pair of rolling wheel rolling surfaces configured to contact a rolling wheel, and
the inner circumferential concavity extends from a widthwise outer end of the rolling wheel rolling surface to the widthwise outer side.

2. The elastic crawler according to claim 1, wherein:
the main body has a tension member built-in, a distance in the thickness direction between the tension member and a bottom of the inner circumferential concavity being equal to a distance in the thickness direction between the tension member and a bottom of the outer circumferential concavity.

3. An elastic crawler device comprising:
the elastic crawler according to claim 2; and
a drive wheel, an idle wheel and the rolling wheel onto which the elastic crawler is wound.

4. An elastic crawler device comprising:
the elastic crawler according to claim 1; and
a drive wheel, an idle wheel and the rolling wheel onto which the elastic crawler is wound.

5. The elastic crawler according to claim 1, wherein:
a circumferential width of the inner circumferential concavity is larger than a circumferential width of the outer circumferential concavity.

6. The elastic crawler according to claim 1, wherein:
a depth of the inner circumferential concavity is larger than a depth of the outer circumferential concavity.

7. The elastic crawler according to claim 1, wherein:
a groove is formed on each of the rolling wheel rolling surfaces between the plurality of cores adjacent in the circumferential direction, the groove extending from a widthwise inner end of the rolling wheel rolling surface toward the widthwise outer side and terminating within the rolling wheel rolling surface.

8. An elastic crawler comprising:
an endless belt main body having elasticity;
a plurality of cores embedded at a spacing in a circumferential direction of the main body, each of the plurality of cores having a pair of wings extending to widthwise outer sides of the main body from a central portion;
a plurality of lugs, each being arranged in a manner protruding from an outer circumferential surface of the main body and extending between the plurality of cores adjacent in the circumferential direction of the main body at a spacing in the circumferential direction of the main body, and having an outer circumferential concavity between the plurality of cores adjacent in the circumferential direction; and
an inner circumferential concavity formed at a position on an inner circumferential surface of the main body overlapping, in a thickness direction of the main body, the outer circumferential concavity of each of the lug, wherein:
a circumferential width of the inner circumferential concavity is larger than a circumferential width of the outer circumferential concavity.

9. The elastic crawler according to claim 8, wherein:
a depth of the inner circumferential concavity is larger than a depth of the outer circumferential concavity.

10. The elastic crawler according to claim 9, wherein:
the main body has a tension member built-in, a distance in the thickness direction between the tension member and a bottom of the inner circumferential concavity being equal to a distance in the thickness direction between the tension member and a bottom of the outer circumferential concavity.

11. An elastic crawler device comprising:
the elastic crawler according to claim 10; and
a drive wheel, an idle wheel and a rolling wheel onto which the elastic crawler is wound.

12. An elastic crawler device comprising:
the elastic crawler according to claim 9; and
a drive wheel, an idle wheel and a rolling wheel onto which the elastic crawler is wound.

13. The elastic crawler according to claim 8, wherein:
the main body has a tension member built-in, a distance in the thickness direction between the tension member and a bottom of the inner circumferential concavity being equal to a distance in the thickness direction between the tension member and a bottom of the outer circumferential concavity.

14. An elastic crawler device comprising:
the elastic crawler according to claim 13; and
a drive wheel, an idle wheel and a rolling wheel onto which the elastic crawler is wound.

15. An elastic crawler device comprising:
the elastic crawler according to claim 8; and
a drive wheel, an idle wheel and a rolling wheel onto which the elastic crawler is wound.

16. An elastic crawler comprising:
an endless belt main body having elasticity;
a plurality of cores embedded at a spacing in a circumferential direction of the main body, each of the plurality of cores having a pair of wings extending to widthwise outer sides of the main body from a central portion;

a plurality of lugs, each being arranged in a manner protruding from an outer circumferential surface of the main body and extending between the plurality of cores adjacent in the circumferential direction of the main body at a spacing in the circumferential direction of the main body, and having an outer circumferential concavity between the plurality of cores adjacent in the circumferential direction; and an inner circumferential concavity formed at a position on an inner circumferential surface of the main body overlapping, in a thickness direction of the main body, the outer circumferential concavity of each of the lug, wherein:

a depth of the inner circumferential concavity is larger than a depth of the outer circumferential concavity.

17. An elastic crawler device comprising:

the elastic crawler according to claim 16; and a drive wheel, an idle wheel and a rolling wheel onto which the elastic crawler is wound.

18. The elastic crawler according to claim 16, wherein:

the main body has a tension member built-in, a distance in the thickness direction between the tension member and a bottom of the inner circumferential concavity being equal to a distance in the thickness direction between the tension member and a bottom of the outer circumferential concavity.

\* \* \* \* \*